(12) United States Patent
Fuglewicz et al.

(10) Patent No.: US 6,595,045 B1
(45) Date of Patent: Jul. 22, 2003

(54) VEHICULAR SENSORS

(75) Inventors: Daniel P. Fuglewicz, Depew, NY (US);
Todd H. Keppler, Hamburg, NY (US);
Chris J. Nowak, Cheektowaga, NY
(US); David G. Schabel, Depew, NY
(US)

(73) Assignee: Veridian Engineering, Inc., Buffalo, NY (US)

( * ) Notice: Subject to any disclaimer, the term of this patent is extended or adjusted under 35 U.S.C. 154(b) by 0 days.

(21) Appl. No.: 09/688,220

(22) Filed: Oct. 16, 2000

(51) Int. Cl.[7] .............................................. G01M 17/00
(52) U.S. Cl. .......................................... 73/129; 73/132
(58) Field of Search .......................... 73/121, 129, 132; 701/70; 340/438, 453

(56) References Cited

U.S. PATENT DOCUMENTS

| | | |
|---|---|---|
| 3,438,646 A | 4/1969 | Hannapel |
| 3,597,728 A | 8/1971 | Kurtz |
| 3,897,116 A | 7/1975 | Carpenter |
| 4,285,234 A | 8/1981 | Basily et al. |
| 4,679,957 A | 7/1987 | Bauer |
| 4,974,679 A | 12/1990 | Reuter |
| 4,986,689 A | 1/1991 | Drutchas |
| 4,998,593 A | 3/1991 | Karnopp et al. |
| 5,022,714 A | 6/1991 | Breen |
| 5,032,821 A | 7/1991 | Domanico et al. |
| 5,052,844 A | 10/1991 | Kendall |
| 5,085,457 A | 2/1992 | Young |
| 5,135,069 A | 8/1992 | Hattori et al. |
| 5,141,069 A | 8/1992 | Yasui |
| 5,143,400 A | 9/1992 | Miller et al. |
| 5,189,391 A | 2/1993 | Feldmann et al. |
| 5,207,299 A | 5/1993 | Feldman |
| 5,224,410 A | 7/1993 | Graichen et al. |
| 5,228,757 A | 7/1993 | Ito et al. |
| 5,253,735 A | 10/1993 | Larson et al. |
| 5,263,556 A | 11/1993 | Frania |
| 5,271,638 A | 12/1993 | Yale |
| 5,276,620 A | 1/1994 | Bottesch |
| 5,285,190 A | 2/1994 | Humphreys et al. |
| 5,335,979 A | 8/1994 | Naitou et al. |
| 5,339,069 A | 8/1994 | Penner et al. |
| 5,347,458 A | 9/1994 | Serizawa et al. |
| 5,433,296 A | 7/1995 | Webberley |
| 5,450,930 A | 9/1995 | Martens et al. |
| 5,472,062 A | 12/1995 | Nagai et al. |
| 5,474,154 A | 12/1995 | Coale |
| 5,487,315 A | 1/1996 | Finet et al. |
| 5,572,187 A | 11/1996 | Williford |
| 5,574,365 A | 11/1996 | Oyama et al. |
| 5,634,698 A | 6/1997 | Cao et al. |

(List continued on next page.)

OTHER PUBLICATIONS

International Search Report of PCT/US01/32194.

*Primary Examiner*—Eric S. McCall
(74) *Attorney, Agent, or Firm*—Steptoe & Johnson LLP

(57) ABSTRACT

A brake stroke sensor and an steering sensor are individually and collectively provided. A brake stroke sensor includes a force-receiving plate, a second plate movable relative to the force-receiving plate, a spring disposed between the plates and operatively connected to the pushrod, a strain gauge bridge mounted on the force-receiving plate and a microcontroller capable of converting the strain gauge bridge signal into digital data. A steering sensor includes a mechanical interface operatively connected to a nonmoving member and a moving member, an encoder capable of transforming the rotational motion of the mechanical interface into an electrical signal, and a microcontroller capable of calculating, from the electrical signal, a count indicative of the relative positions of the members. A combined brake stroke and steering sensor may include individual and common elements of both the brake stroke and steering sensors described above. The brake stroke, steering sensor and combined brake stroke and steering sensor may utilize a modem for transmitting data to a system controller over an electrical bus.

32 Claims, 11 Drawing Sheets

U.S. PATENT DOCUMENTS

| | | |
|---|---|---|
| 5,669,678 A | 9/1997 | Stumpe et al. |
| 5,683,152 A | 11/1997 | Hu |
| 5,689,231 A | 11/1997 | Olson |
| 5,701,119 A | 12/1997 | Jurras, III |
| 5,709,281 A | 1/1998 | Sherwin et al. |
| 5,709,437 A | 1/1998 | Schlüter et al. |
| 5,762,406 A | 6/1998 | Yasui et al. |
| 5,765,115 A | 6/1998 | Ivan |
| 5,790,966 A | 8/1998 | Madau et al. |
| 5,825,287 A | 10/1998 | Zarybnicky, Sr. et al. |
| 5,848,672 A | 12/1998 | Brearley et al. |
| 5,873,581 A | 2/1999 | Yale |
| 5,880,367 A | 3/1999 | Vaughn |

| PUSHROD LENGTH (inches) | AMPLIFIED OUTPUT (mV) | PUSHROD LENGTH (inches) | AMPLIFIED OUTPUT (mV) | PUSHROD LENGTH (inches) | AMPLIFIED OUTPUT (mV) |
|---|---|---|---|---|---|
| 6.247 | 62.17 | 7.247 | 87.15 | 8.247 | 115.89 |
| 6.297 | 63.55 | 7.297 | 88.18 | 8.297 | 118.51 |
| 6.347 | 65.56 | 7.347 | 88.69 | 8.347 | 121.10 |
| 6.397 | 66.87 | 7.397 | 93.30 | 8.397 | 123.23 |
| 6.447 | 67.54 | 7.447 | 93.16 | 8.447 | 125.00 |
| 6.497 | 67.51 | 7.497 | 95.30 | 8.497 | 126.91 |
| 6.547 | 68.65 | 7.547 | 97.85 | 8.547 | 131.67 |
| 6.597 | 69.99 | 7.597 | 100.20 | 8.597 | 136.27 |
| 6.647 | 71.34 | 7.647 | 100.89 | 8.647 | 147.08 |
| 6.697 | 73.09 | 7.697 | 101.94 | | |
| 6.747 | 75.69 | 7.747 | 105.91 | | |
| 6.797 | 77.38 | 7.797 | 107.46 | | |
| 6.847 | 79.10 | 7.847 | 108.45 | | |
| 6.897 | 80.00 | 7.897 | 109.50 | | |
| 6.947 | 80.56 | 7.947 | 111.03 | | |
| 6.997 | 81.42 | 7.997 | 112.36 | | |
| 7.047 | 82.80 | 8.047 | 112.28 | | |
| 7.097 | 83.39 | 8.097 | 113.24 | | |
| 7.147 | 84.89 | 8.147 | 114.22 | | |

VEHICULAR SENSORS

BACKGROUND

1. Field of the Invention

The present invention relates to the field of vehicular sensor systems.

2. Discussion of Background Information

It is desirable to maintain and monitor the proper functioning of a vehicle's brake and steering systems to enhance the safety of the driver and general public, and to help determine whether these systems meet federal safety standards for correct operation. If either the braking or steering systems of a commercial vehicle do not meet federal operational requirements, the commercial vehicle can, be placed out-of-service ("OOS"), until the problematic system is repaired and returned to acceptable operational limits.

Electronic parametric monitoring devices that warn of an out-of-tolerance condition to date have not been widely used and have not been generally installed by original equipment manufacturers ("OEM") on new commercial vehicles. Some after-market electronic systems tend to be expensive, not readily compatible with various types of vehicles, and difficult to install.

Many of the brakes on commercial vehicles are air-powered. In a typical air-powered braking system, a brake actuator effects the movement of a pushrod, which in turn operates an S cam or disk brake mechanism, which forces the brake shoes/pads against the drums/rotors providing the friction necessary to stop the vehicle. A brake actuator may work in the following manner: upon braking compressed air fills a brake actuator chamber and a pushrod is pushed out of a brake actuator service chamber, actuating the vehicle's braking components which are typically located in the vehicle's brake drum. As the brake shoes/pads associated with an individual wheel wear, the pushrod must travel a greater distance in order to force the brake shoes/pads against the drums/rotors and thus provide the friction necessary to stop the vehicle. Because the pushrods have a limited length of travel, as the brake shoes/pads wear, at some point the pushrod cannot move enough to actuate the brakes fully, resulting in reduced braking force. Agencies enforcing federal and state vehicle regulations may utilize the length of pushrod travel as a measure of whether the brakes are functioning properly.

Devices known as slack adjusters are typically used to readjust the brakes as necessary to ensure that the pushrod can fully actuate the brakes. These devices are available in both automatic and manual varieties. However, if the driver fails to manually readjust the brakes regularly, or if the automatic adjuster does not function properly the brakes will eventually be in an OOS condition.

Prior art methods of monitoring braking systems can entail time-consuming and dirty work. For example, in order to determine the length of pushrod travel, one person goes under the vehicle with a measuring device (typically a ruler or tape measure) while another person applies force to the vehicle's brake pedal in the operator's cab. The person under the vehicle measures the distance the pushrod extends out of the brake chamber before and after brakes are applied. The difference between these two measurements is the brake stroke. This measurement is performed for each brake actuator on the vehicle—including any trailers attached to a semi-tractor. Although brake inspection is part of the driver's daily vehicle inspection procedure, the inconvenience involved in monitoring braking systems results in brake stroke measurements often not be taken as often as desirable.

Some brake actuator manufacturers have addressed this problem by manufacturing systems that indicate whether brakes are operating within acceptable limits. MGM Brakes of Charlotte, N.C. manufactures one such system. MGM's system, known as a "Stroke-Alert" ® consists of a band which is visible when the pushrod has extended to a certain length. A disadvantage of this system is that two persons are generally required to use this system; one person to press the brake pedal in the cab and one to visually inspect each brake actuator device. Other brake stroke warning devices include systems with graduated switches installed adjacent to the pushrod itself. In U.S. Pat. No. 5,450,930 to Martens et al., the switches are spaced apart so that the tripping of one switch indicates that the pushrod has started to move, and the tripping of the second switch indicates that the pushrod has moved too far. U.S. Pat. No. 5,825,287 to Zarybnicky, Sr. et al. discloses a system in which magnets are mounted on the pushrod. Switches are mounted in the housing of the brake actuator to monitor the movement of the magnets. Closure of a first switch, by passage of a first magnet over the switch, is an indication that the brake assembly is approaching a condition where maintenance may be recommended, closure of a second switch is an indication that the brakes should be immediately serviced. U.S. Pat. No. 5,433,296 to Webberley discloses a system that provides an indication to the vehicle operator of a number of different discrete positions of a brake activation arm. U.S. Pat. No. 5,825,287 to Herman discloses a method and apparatus of electronically measuring air pressure and pushrod travel and determining from those two measurements whether the brakes are properly adjusted. Pushrod travel is determined via the use of an analog oscillator circuit, whose frequency of oscillation is proportional to the distance of the brake activation arm from an electronic sensor.

In addition to proper functioning of a commercial vehicle's braking system, it is also desirable to monitor the proper functioning of a commercial vehicle's steering system.

Steering lash generally refers to looseness in the steering system between the steering column and steering knuckles. It is a measurement of the maximum amount of rotation the driver must exercise on a vehicle's steering column before the vehicle's tires begin to turn to the right or left in response to the driver's action. Excessive steering lash results in the driver having to adjust the steering column position often and can cause excessive wear to the front tires (i.e., the steerable wheels). It can contribute to driver fatigue and impair the driver's ability to precisely control the vehicle and can also lead to premature tire wear.

One way of measuring steering lash is to examine the amount of "play" in the steering system. This measurement is made by rotating the steering column in one direction until all slack is taken up, and then rotating the steering column in the other direction until the front tires just start to move.

SUMMARY OF THE INVENTION

The invention provides methods and apparatus to measure vehicle safety parameters such as, for example, brake stroke and steering lash and describes a system which may either be easily installed in new vehicles by OEMs or in vehicles already in service.

An embodiment of the invention incorporates a brake stroke sensor that can determine the actual position of the brake pushrod at any point throughout the pushrod's entire length of travel. The embodiment of the invention may incorporate a steering sensor, which can determine the amount of steering lash that exists in the vehicle's steering system, and/or the amount of looseness between steerable wheels.

The present invention preferably provides a brake stroke sensor including a force-receiving plate, a second plate movable relative to the force-receiving plate, a spring disposed between the plates and operatively connected to the pushrod, a strain gauge bridge mounted on the force-receiving plate and a microcontroller for converting the strain gauge bridge signal into digital data.

The present invention also preferably provides a steering sensor including a mechanical interface operatively connected to a nonmoving member and a moving member, an encoder for transforming the rotational motion of the mechanical interface into an electrical signal, and a microcontroller capable of calculating, from the electrical signal, a count indicative of the relative positions of the members.

Various features of the invention include combined brake stroke and steering sensor with the individual and common elements of both the brake stroke and steering sensors described above; a brake stroke, steering sensor, and combined brake stroke and steering sensor utilizing a modem for transmitting data to a system controller over an electrical bus; and methods of determining brake stroke, steering lash, and steerable wheel looseness with each of the sensors herein described.

Other exemplary embodiments and advantages of the present invention may be ascertained by reviewing the present disclosure and the accompanying drawings.

BRIEF DESCRIPTION OF THE FIGURES

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION OF PREFERRED EMBODIMENTS OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

A. BRAKE STROKE SENSOR

Figure 1:
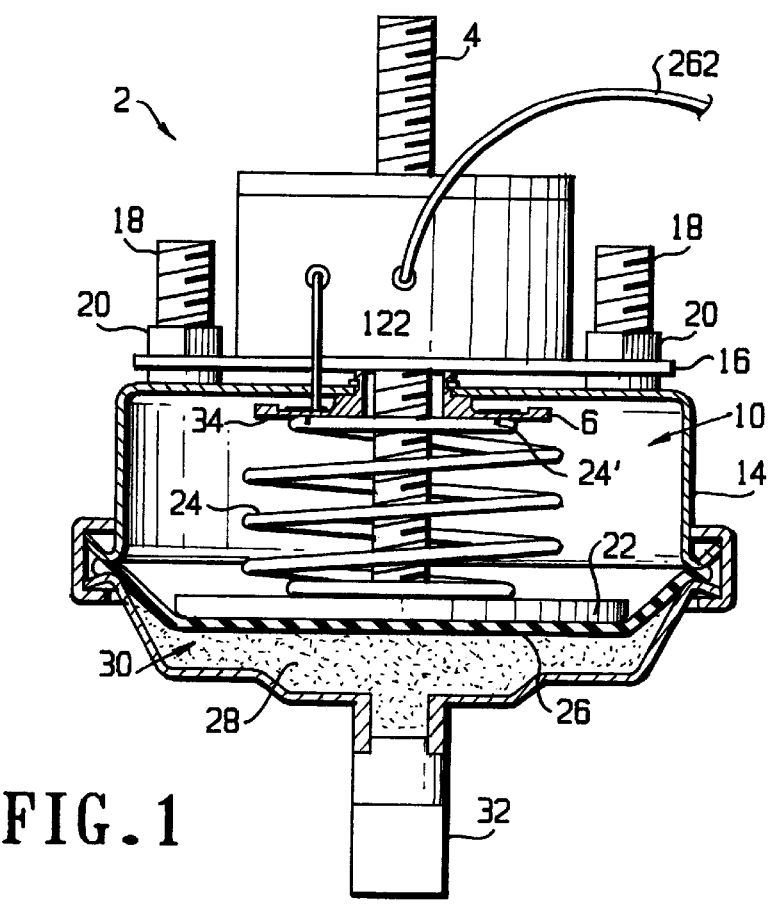
FIG. 1 shows a partial sectional view of a brake actuator system with a brake stroke sensor installed.

FIG. 1 illustrates a brake actuator system with a brake stroke system installed. A brake sensor 2 for determining the position of a brake actuator's pushrod 4 at any point throughout its entire range of motion includes a force-sensing assembly 6 and a brake sensor control/communications assembly 8. The force-sensing assembly 6 is preferably housed within the brake actuator service chamber 10, while the brake sensor control/communications assembly 8 may be attached elsewhere, preferably only a short distance away to minimize length of interface conductors 12 between the force-sensing assembly 6 and the brake sensor control/communications assembly 8. For example, the brake sensor control/communications assembly 8 may be attached to the brake actuator assembly 14 via a mounting bracket 16 and the brake actuator's mounting studs 18 and mounting hardware 20.

When a driver wishes to stop a vehicle, the driver will apply vehicle brakes, typically by applying pressure to a brake pedal in the vehicle's cab. Applying vehicle brakes causes a brake actuator assembly 14 at each braked wheel to apply force to a braking mechanism (e.g., an S-cam or disk brake mechanism) associated with that wheel. The brake actuator assembly 14 has a pushrod 4 extending from its brake actuator service chamber 10. One end of the pushrod 4 is attached to a pushrod plate 22 (typically fixedly), while the other end (not shown) of the pushrod 4 is attached to the vehicle's braking mechanism (typically pivotably). With no brakes applied, the pushrod 4 is predominantly retracted into the brake actuator service chamber 10, held there by a spring 24 (and typically restrained from further retraction by the brake chamber diaphragm 26). This position is considered to be the pushrod's 4 home position. FIG. 1 shows the chamber partially pressurized.

The brake sensor 2 operates generally as follows. When brakes are applied, compressed air 28 is delivered to the brake actuator working chamber 30 via the brake actuator airline 32. The compressed air 28 exerts pressure on a brake chamber diaphragm 26, which in-turn, exerts pressure on the pushrod plate 22 and pushrod 4. As the pushrod 4 moves outwardly from the brake actuator service chamber 10, the spring 24 is compressed. The spring 24 is used to return the pushrod plate 22 and pushrod 4 to their home position after the brakes are released and the compressed air 28 is vented from the brake actuator working chamber 30.

A force-sensing assembly 6 is positioned between a first end 24' of the spring 24 and an interior surface of the brake actuator service chamber 10, such that the pushrod 4 passes through a bore in the center of the force-sensing assembly 6. The first end 24' of the spring 24 may rest on a first surface 34 of the force-sensing assembly 6 and lies substantially concentrically about the pushrod 4.

Figure 2:
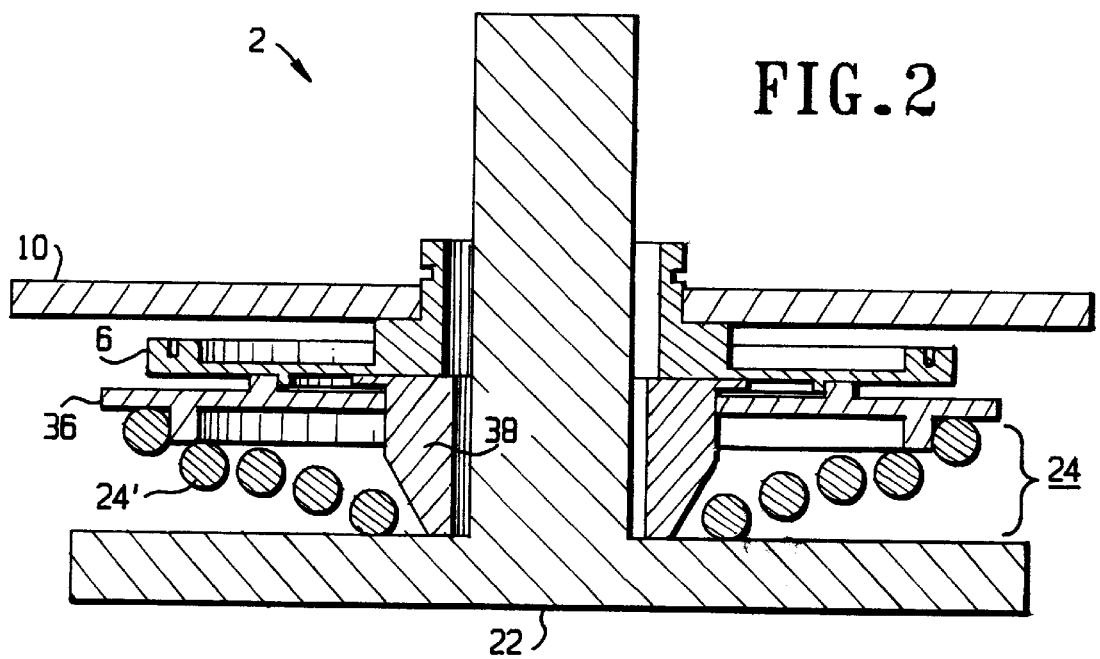
FIG. 2 is a cross-sectional view of an alternate embodiment of a brake stroke sensor.

In an alternate embodiment of FIG. 2, an adapter 36 may be disposed between the first end 24' of the spring 24 and the force-sensing assembly 6. FIG. 2 also illustrates a spacer 38 for preventing the pushrod plate 22 from contacting the force-sensing assembly 6 and thus for preventing the pushrod plate 22 and spring 24 from crushing the force-sensing assembly 6 into the interior surface of the brake actuator service chamber 10.

As shown in FIG. 1, the spring 24 pushes either directly (as in the embodiment of FIG. 1) or indirectly (as in the embodiment of FIG. 2), upon the force-sensing assembly 6, which receives all of the force created by the spring 24. The spring force imparts a strain on the force-sensing assembly 6. Strain is the amount of deformation of a body due to an applied force. The induced strain on the force-sensing assembly 6 is proportional to the amount of force applied by the spring 24. The spring force is proportional to the amount of spring compression, which is proportional to the distance that the pushrod 4 has been extended out of the brake actuator service chamber 10.

Figure 3A:
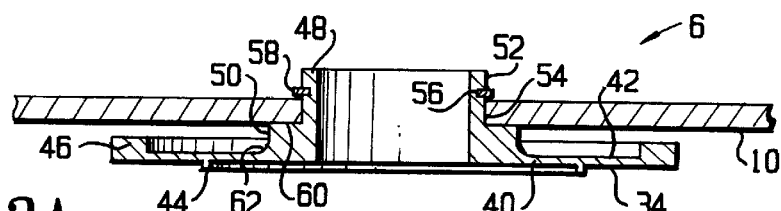
FIG. 3A shows a cross-section of a force-sensing assembly installed in a brake actuator housing.
Figure 3B:
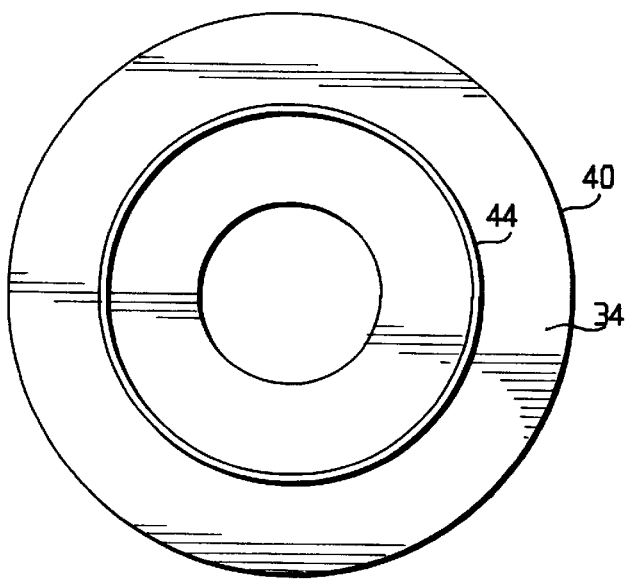
FIG. 3B shows top view of a first side of a force-sensing assembly.

FIGS. 3A and 3B, illustrate details of the force-sensing assembly 6, which includes a force-receiving plate 40 having a first surface 34 and a second surface 42. As shown in elevation in FIG. 3B, the first surface 34, has a feature 44 to align the spring 24 (FIG. 1) and to maintain the spring's concentric alignment with the pushrod 4 (FIG. 1) (e.g., a locating feature to positively locate and retain the correct spring location). The spring alignment feature 44 is an annular ridge or cusp, continuous throughout three hundred and sixty degrees, and substantially rectangular in cross section. One of ordinary skill in the art will recognize that other features may perform the same function of aligning the spring 24 (FIG. 1) and maintaining the spring's concentric alignment with the pushrod 4 (FIG. 1).

The second surface 42 of the force-receiving plate 40 has a protruding annular ring 46 of substantially square or rectangular cross section whose outer edge preferably coincides with the outermost diameter of the force-receiving plate 40. The annular ring 46 improves the stiffness of the force-receiving plate 40 and may act as a darn to contain potting material poured onto the second surface 42. A force-receiving plate 40 may not need an annular ring 46 to improve the stiffness of the force-receiving plate 40, depending on the type of material utilized for the force-receiving plate 40 and the characteristics of the spring 24 (FIG. 1).

The second surface 42 of the force-receiving plate 40 has a right circular cylinder-like protrusion 48 that extends away from the second surface 42 of the force-receiving plate 40. This right circular cylinder-like protrusion 48 has at least two sections. A first section 50 lies closest to the second surface 42. A second section 52 lies furthest from the second surface 42. The diameter of the first section 50 is larger than the diameter of the second section 52. When installed, the second section 52 passes through a bore 54 in the brake actuator service chamber 10. The second section 52 may have a groove 56 on its outer surface to accept a retaining ring 58. The groove 56 and retaining ring 58 are utilized for ease of assembly when installing the force-sensing assembly 6 into the brake actuator service chamber 10.

The reduction in the diameter of the right circular cylinder-like protrusion 48 creates a contact surface or shoulder 60 that rests against an interior surface of the brake actuator service chamber 10. Spring force is exerted upon the force-receiving plate 40 at approximately the location of feature 44. The spring force tends to deflect the force-receiving plate 40 toward the interior surface of the brake actuator service chamber 10. A radius 62, at the intersection of the first section 50 of the right circular cylinder like protrusion 48 and the second surface 42 of the force-receiving plate 40, is located at a stress concentration point on the force-receiving plate 40. The radius 62 acts to distribute the stress across the surface of the force-receiving plate 40.

In the preferred embodiment, the force-receiving plate 40 is machined from a single piece of type 6061-T6 Aluminum. The force-receiving plate 40 may also be manufactured in other manners, including, for example, casting a single assembly or brazing multiple components into a finished assembly. Other types of material, such as stainless steel, are also well-suited for this application. Other shapes may also be utilized. In the preferred embodiment, the right circular cylinder-like protrusion 48 of the force-receiving plate 40 is circular and consists of at least two sections 50 and 52 with different diameters. Other shapes may also be utilized. Variations in the type of material, manufacturing process, and shape of the force-receiving plate 40 are possible to vary the location and amount of strain that can be impressed upon it, however, such deviations from the material, manufacture and shape of the preferred embodiments presented herein will not depart from the scope of the invention.

Figures 4, 5:
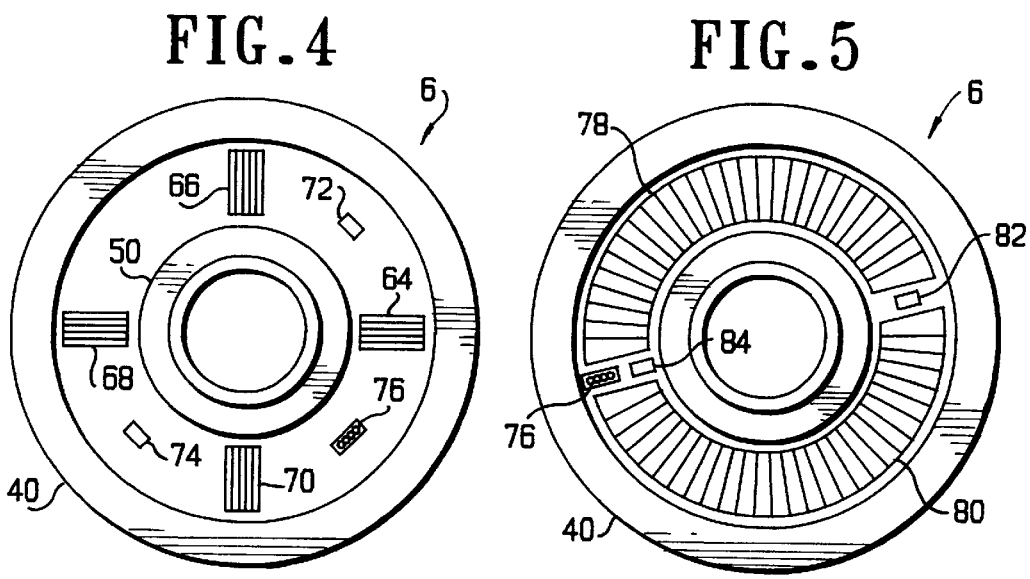
FIG. 4 is a diagrammatic illustration of a second surface of a force-sensing assembly illustrating an example of the positioning of strain gauges, resistors, and connector.
FIG. 5 is a diagrammatic illustration of an alternate embodiment of a second surface of a force-sensing assembly showing an example of the positioning of strain gauges, resistors, and connector.

FIG. 4 illustrates a preferred force-sensing assembly 6, which includes at least four strain gauges 64, 66, 68, 70, the force-receiving plate 40, at least two resistors 72, 74, a connector 76 (if desired), and associated interconnecting conductors (not shown). Strain gauges 64, 66, 68, 70 are adherently bonded to a surface of the force-receiving plate 40. Model CAE-13-125UW-350 strain gauges, manufactured by Measurements Group, Inc. of Raleigh, N.C. may be used. This type of strain gauge is a linear strain gauge with nominal impedance of about three-hundred and fifty Ωs. Each of the four strain gauges 64, 66, 68, 70 is bonded to the force-receiving plate 40 so that the strain measuring directions are approximately parallel to imaginary radial lines extending from the center of the force-receiving plate 40 to the edge of the force-receiving plate 40. Each of the four strain gauges 64, 66, 68, 70 is preferably mounted at approximately the same radial distance from the center of the force-receiving plate 40. And, each of the four strain gauges 64, 66, 68, 70 is preferably mounted so that the strain sensing portion of the gauge is located at approximately the edge of the radius 62 (FIG. 3A), between the right circular cylinder like-protrusion 48 and the second surface 42 of the force-receiving plate 40. The four strain gauges 64, 66, 68, 70 are used, approximately ninety degrees apart from each other, in order to reasonably accurately determine the strain imposed upon the force-receiving plate 40 by the spring 24 (FIG. 1).

FIG. 5 illustrates an alternate embodiment of a force-sensing assembly 6. The force-sensing assembly 6 includes at least two strain gauges 78, 80, a force-receiving plate 40, at least two resistors 82, 84, a connector 76 (and if desired), and associated interconnecting conductors (not shown).

Strain gauges 78, 80 are adherently bonded to a surface of the force-receiving plate 40. The strain gauges cover almost the entire surface to which the spring 24 (FIG. 1) will impart strain. The nominal impedance of each strain gauge is about three hundred and fifty Ohms. Each of the strain gauges 78, 80 is bonded to the force-receiving plate 40 so that the strain measuring directions are approximately parallel to imaginary radial lines extending from the center of the force-receiving plate 40 to the edge of the force-receiving plate 40. Each of the two strain gauges 78, 80 are preferably mounted at approximately the same radial distance from the center of the force-receiving plate 40. In addition, each is preferably mounted so that the strain sensing portion of each gauge is located at approximately the edge of the radius 62 (FIG. 3A), between the right circular cylinder-like protrusion 48 and the second surface 42 of the force-receiving plate 40. The two strain gauges 78, 80, are mounted approximately one hundred and eighty degrees apart from each other. The two strain gauges 78, 80 are used in order to determine the strain imposed upon the force-receiving plate 40 by the spring 24 (FIG. 1).

It will be readily apparent to one of ordinary skill in the art that other types of strain gauges having other nominal impedances or other types of strain determining sensors could be employed so long as the strain determining sensors reasonably accurately determine the strain imposed upon the force-receiving plate 40 by the spring 24.

Strain gauges will typically vary their resistance not only with strain but also with temperature. As the material that a strain gauge is mounted to expands or contracts due to temperature, the resistance of the strain gauge would change if no compensation were applied. One may wish to utilize temperature compensated strain gauges or may alternatively select to incorporate temperature-sensing resistors into the circuit. In order to compensate strain gauges for effects of temperature, strain gauge manufacturers have developed strain gauge substrates with the various temperature coefficients of expansion. As stated previously, in the embodiments described herein, the force-sensing assembly is manufactured of aluminum, therefore, strain gauges designed to be mounted on aluminum (i.e., those utilizing substrates with temperature coefficients of expansion approximately equal to that of aluminum) are utilized.

Strain gauge bridges may be balanced by utilizing additional resistors in a bridge configuration. Resistors 72, 74 (FIG. 4) and 82, 84 (FIG. 5) are included in the strain gauge bridge configurations to balance the bridge. Their temperature coefficients are preferably chosen so as to minimize any resistance change due to temperature.

Figure 6:
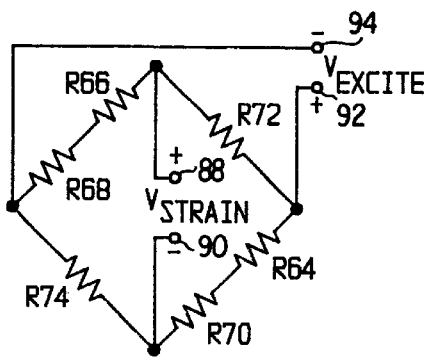
FIG. 6 illustrates an electrical schematic for the strain gauge bridge circuit of the type depicted in FIG. 4.
Figure 7:
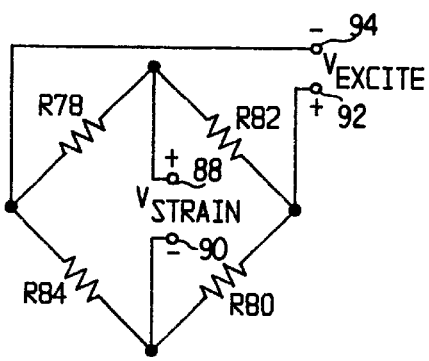
FIG. 7 illustrates an electrical schematic for the strain gauge bridge circuit of the type depicted in FIG. 5.

Strain gauges are resistive devices. As a strain gauge is flexed its resistance value changes. However, the resistance changes are very small. Therefore, strain gauges are typically used in Wheatstone bridge configurations. The strain gauge bridge configuration depicted in the preferred embodiments of FIGS. 6 and 7 are hereinafter referred to as the "strain gauge bridge 86." By providing an excitation voltage, $V_{excite}$, to the strain gauge bridge 86, a voltage can be generated across the strain gauge bridge 86 that is proportional to the resistance of the strain gauges. The voltage that is proportional to the resistance of the strain gauges will hereinafter be referred to as $V_{strain}$. FIG. 6 presents a schematic representation of the electrical configuration of a preferred embodiment of the strain gauge bridge 86 utilized in the force-sensing assembly 6 of FIG. 4. The measured voltage of the strain gauge bridge configuration of FIG. 6, $V_{strain}$, is:

$$V_{strain} = V_{excite}\left(\frac{R_{66} + R_{68}}{R_{66} + R_{68} + R_{72}} - \frac{R_{74}}{R_{64} + R_{70} + R_{74}}\right)$$

FIG. 7 presents a schematic representation of the electrical configuration of an alternate embodiment of the strain gauge bridge utilized in the force-sensing assembly 6 of FIG. 5. The measured voltage of the strain gauge bridge configuration, $V_{strain}$, of the bridge of FIG. 7 is:

$$V_{strain} = V_{excite}\left(\frac{R_{78}}{R_{78} + R_{82}} - \frac{R_{84}}{R_{80} + R_{84}}\right)$$

Figures 8, 9:
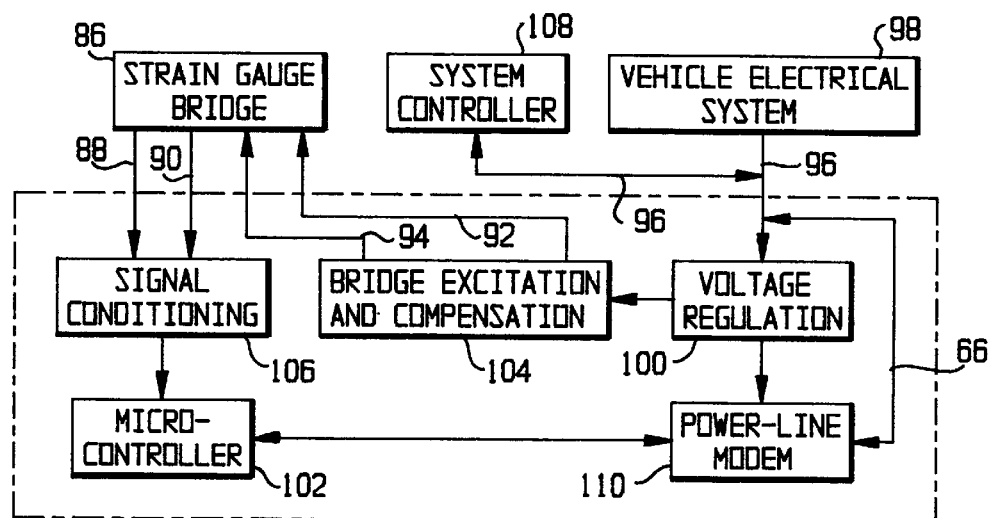
FIG. 8 illustrates a block diagram of a brake stroke sensor.
FIG. 9 is a table of data comparing actual $V_{strain}$ to pushrod stroke.

FIG. 8 illustrates a block diagram of a brake stroke sensor. The strain gauge bridge 86 from either embodiment presented above is connected to a brake sensor control/communication assembly 8 via four conductors: $+V_{strain}$ 88, $-V_{strain}$ 90, $+V_{excite}$ 92, and $+V_{excite}$ 94. The system preferably uses the vehicle's chassis 176 for ground and uses the vehicle's electrical power-line 96 as both a power and a communications bus.

A vehicle's electrical power-line 96 provides vehicle electrical power (typically 12 volts direct current) from the vehicle's electrical system 98 to the brake sensor control/communications assembly 8. The vehicle's electrical power is passed through a voltage regulator 100 to generate regulated voltages to power other circuitry including, for example, a microcontroller 102.

Regulated voltage is passed to the strain gauge bridge excitation and compensation circuit 104, which 1) generates the excitation voltage, $V_{excite}$, for the strain gauge bridge 86 and 2) compensates the excitation voltage for changes in temperature. The excitation voltage is applied to the strain gauge bridge 86 via conductors 92 and 94. The strain gauge bridge 86 delivers a relatively low-level analog signal, $V_{strain}$, to the signal conditioning circuit 106 via conductors 88, 90. The signal conditioning circuit 106 preferably amplifies and low-pass filters the signal. The circuitry utilized to regulate voltage, generate strain gauge bridge excitation voltages, compensate the voltages for temperature changes, amplify and filter the output voltages from a strain gauge bridge is well known to those of ordinary skill in the art and is not being described in further detail here.

Microcontroller 102 performs an analog-to-digital conversion to convert the output of the signal conditioning circuit 106 (and thus the output of the strain gauge bridge) from an analog voltage to a digital data representation of that voltage. The microcontroller 102 compares each new data acquisition to a value it has stored in its memory. That stored value is a maximum value output by the strain gauge bridge 86 (after amplification and filtering by the signal conditioning circuit 106) measured since the microcontroller 102 was last commanded to transmit its brake stroke value. If the new data acquisition is greater than that stored in the memory of the microcontroller 102, then the new data acquisition replaces the data stored in memory. The microcontroller 102 stores the maximum value in its memory until it is addressed by a system controller 108 via the power-line modem 110. Storage of the maximum value in the memory of microcontroller 102 ensures that the maximum brake stroke value is always reported. Calibration coefficients are set during calibration of the force-sensing assembly 6 and are stored in the microcontroller's 102 nonvolatile memory. The calibration coefficients used in the preferred embodiment are the coefficients of a second order polynomial (i.e., of the form $Ax^2+Bx+C$) which describe a curve that most closely describes a relationship between $V_{strain}$ and pushrod stroke for the force-sensing assembly associated with the microcontroller 102. The invention described herein is not limited to second order polynomials. Other types of equations, utilizing greater or fewer than three coefficients, can be used to describe a curve that approximates the relationship between $V_{strain}$ and pushrod stroke. Therefore, while the preferred embodiment stores three coefficients, other embodiments may store greater or fewer than three coefficients without departing from the scope of the invention described herein.

Stored within the nonvolatile memory of the microcontroller 102 is a unique address for the microcontroller. The microcontroller 102 responds (i.e., transmits data) only to requests for data addressed to it. Thus only one microcontroller may transmit data on the communications/power bus at any given time. After the microcontroller 102 receives a properly addressed request for data, it outputs both the stored maximum value and stored calibration coefficients for the force-sensing assembly 6 associated with the microcontroller 102. The microcontroller 102 transmits its data to the power-line modem 110, which modulates the data onto the vehicle's electrical power-line 96, allowing the requested brake stroke data to be received by the system controller 108.

The microcontroller 102 may be a model PIC12C674 manufactured by Microchip Technology Incorporated of Chandler, Ariz. The power-line modem 110 may be model ST7537, manufactured by STMicroelectronics of Lexington, Mass. This power-line modem is specifically designed to transmit and receive data over power-lines utilizing frequency shift key modulation. Other types of modems, utilizing other types of modulation, such as, for example, amplitude shift key or spread spectrum, may also be suitable for the purposes of this invention.

FIG. 9 illustrates raw data recorded from a force-sensing assembly 6 installed in a brake actuator service chamber 10. The force-sensing assembly 6 was instrumented with four strain gauges as described above and illustrated in FIGS. 4 and 6. Carbon resistors were used, each with a resistance of approximately 700 Ohms. The pushrod length was changed by "jacking" the pushrod out of the brake actuator service chamber 10 using a jacking nut and plate.

Figure 10:
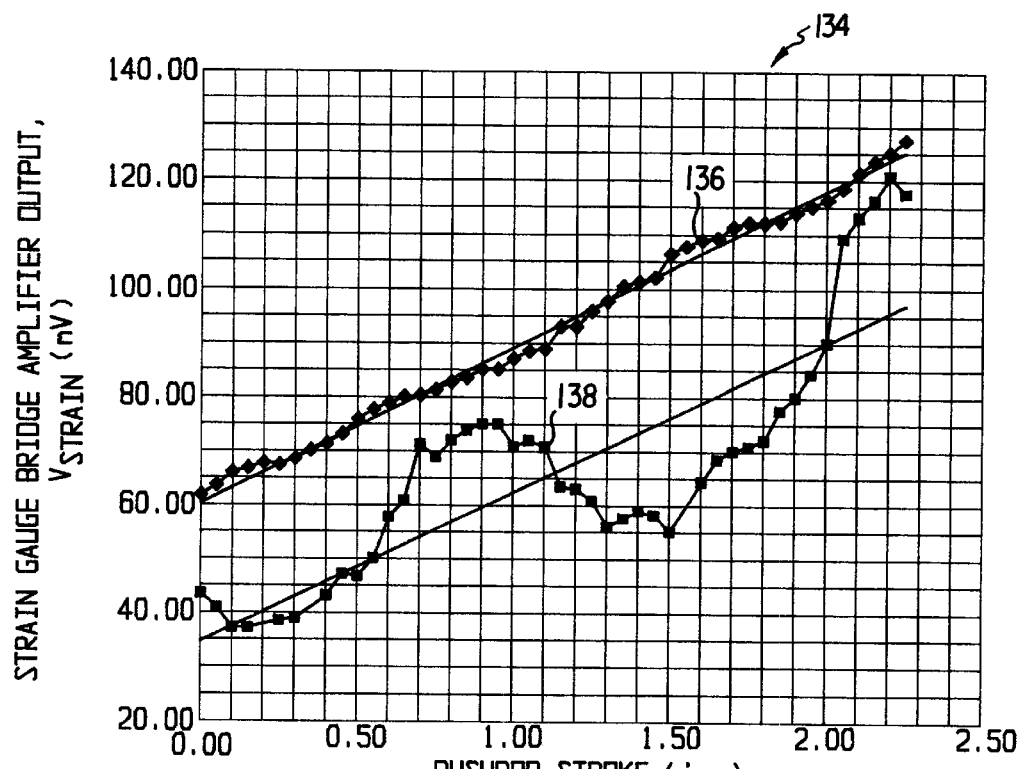
FIG. 10 graphically illustrates $V_{strain}$ vs. pushrod stroke for two embodiments of the invention.

FIG. 10 depicts strain gauge bridge signal conditioning circuit 106 output, $V_{strain\ as}$ a function of pushrod stroke. The data 136 generated from the embodiment of FIG. 4 is substantially a straight line—indicating a linear relationship between the measured strain gauge bridge output voltage and pushrod stroke. The data from another embodiment of the invention is depicted in the lower plot 138. This embodiment utilized the same force-receiving plate 40 as the first prototype however, the strain gauges, mounted to the force-receiving plate 40, were mounted such that their measurement axis lied along an annulus, the radius of which was slightly less than the radius of the spring 24 (FIG. 1). This is a variation on the preferred embodiments of FIGS. 4 and 5, wherein the strain gauges are mounted such that their measurement axis lied along straight lines projecting from the center of the force-receiving plate 40 toward its outer edge.

B. STEERING SENSOR

Figure 11:
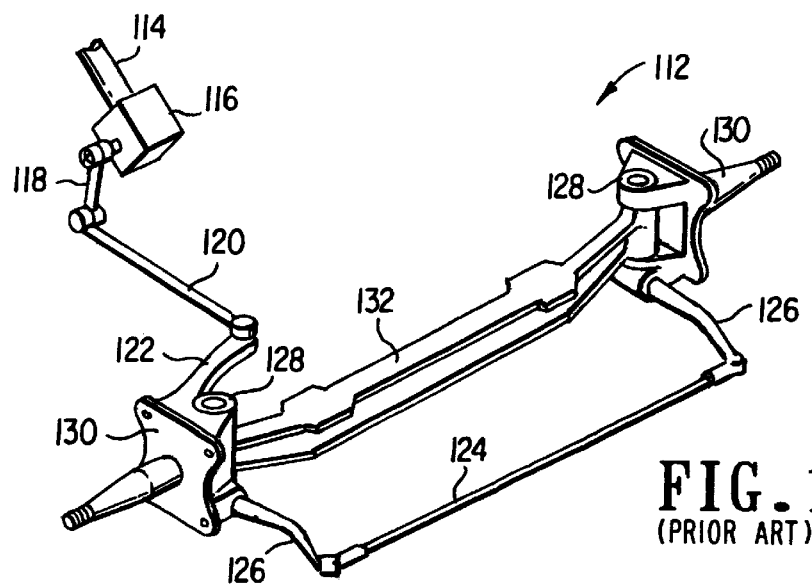
FIG. 11 illustrates typical mechanical components of a vehicle's steering system.

FIG. 11 illustrates a vehicle's steering system 112, which typically includes a steering wheel (not shown), steering column 114, steering box 116, drop arm 118, drag link 120, spindle arm 122, track rod 124, steering arm 126, king pins 128 and steering knuckles 130. Steering knuckles 130 are typically pivotably attached to a vehicle's chassis (not shown) via a beam axle 132.

A system to measure steering lash consists of a set of at least two steering sensors. A third steering sensor can be added to enable the measurement of "looseness" between steerable wheels. These steering sensors monitor either the relative position of the steering knuckles 130 in relation to the chassis (not shown) or the relative rotational position of the steering column 114.

Figure 12A:
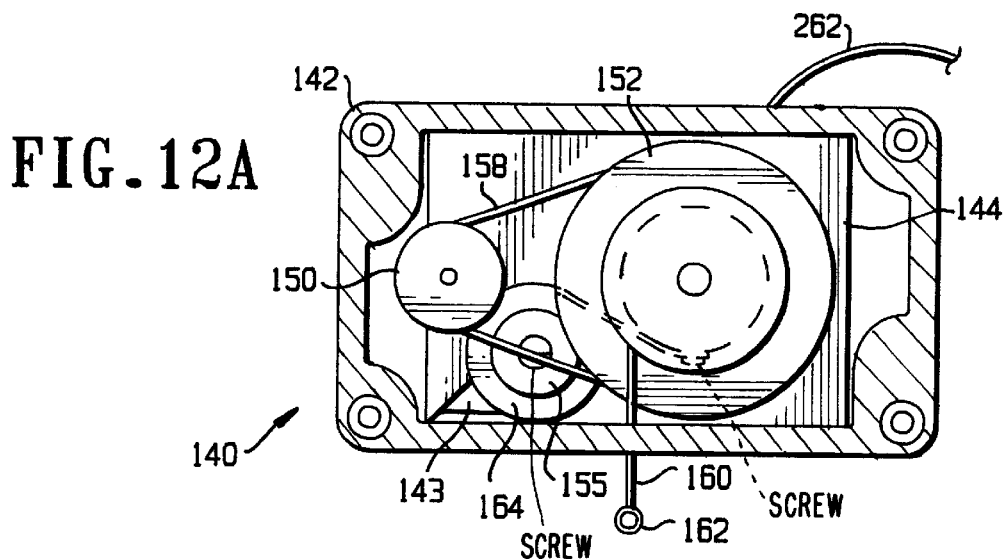
FIG. 12A shows a top cut-away view of a steering sensor.
Figure 12B:
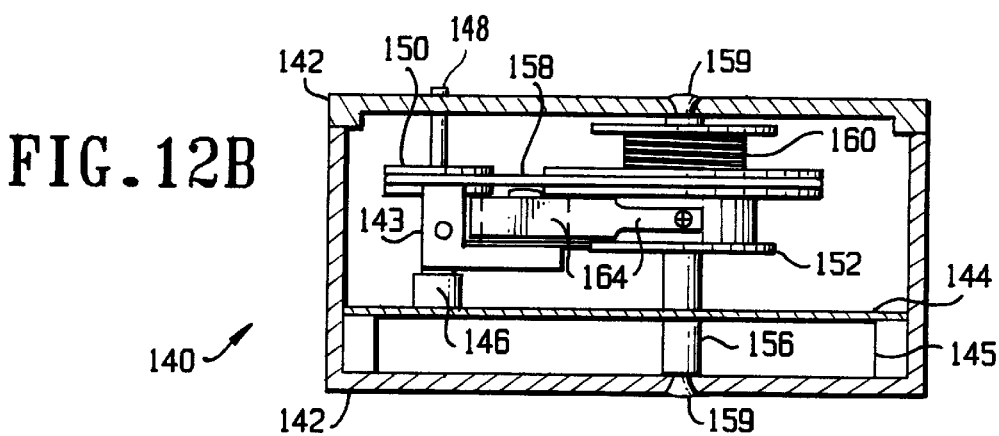
FIG. 12B shows a side cut-away view of a steering sensor.

FIGS. 12A and 12B illustrate top and side cut-away views of a steering sensor 140. A housing 142 encloses the mechanical and electronic components of the steering sensor 140. A printed circuit board 144 supports various electronic components of the steering sensor 140. A pair of mounting bosses 145 support a printed circuit board 144 from the base of steering sensor 140. A power/communications cable 262 delivers power to the steering sensor 140 and acts as a communication line between steering sensor 140 and other devices in the vehicle.

A shaft 156 passes through circuit board 144 to rotatably support a transfer pulley 152. Screws 159 connect shaft 156 to housing 142.

A cable 160, wound around a spool of transfer pulley 152, connects transfer pulley 152 to an external fixed location within the vehicle through a lug 162. A resilient belt 158 joins the encoder pulley 150 and the transfer pulley 152 and transfers proportionally the rotation of the transfer pulley 152 to the encoder pulley 150. A shaft of encoder pulley 150 extends through the housing 142 to provide proper alignment.

A recoil spring 164 has a first end that connects to transfer pulley 152 through a screw, and a second end wound around a recoil spring spool 155. A shoulder screw mounts recoil spool 155 onto a mounting bracket 143. Mounting bracket 143 attaches to housing 142 via a screw. Recoil spring 164 supplies tension on cable 160, and is substantially wound around spool 155 when cable 160 is substantially retracted into housing 142.

An encoder 146, glued to encoder pulley 150, tracks the movement of cable 160 into and out of housing 142. The encoder 146 preferably is of the type known as a quadrature incremental encoder or may be any type of encoder that provides indications of both the rotational position and direction of rotation as outputs of the encoder. In the preferred embodiment, an encoder is utilized, which provides six pulses per revolution, where a derived sign of the pulse is indicative of rotational direction. The preferred encoder 146 is a model 3315R manufactured by Bourns, Inc. of Riverside, Calif. The encoder transmits two signals indicative of rotational displacement and direction of rotation of the encoder shaft. The preferred encoder produces six pulses per revolution; however, other encoders producing various other amounts of pulses per revolution may be used without departing from the scope of the invention. Alternately, encoders producing digital words indicative of position (e.g., Gray-scale coding) may be used.

In a preferred embodiment, a microcontroller similar to 102 FIG. 8 and mounted on printed circuit board 144 in the steering sensor 140 keeps a running "count" of the number and sign of the pulses produced by the encoder 146. The microcontroller count is reset to "zero" upon power-up of the system or upon receipt of a reset command from the system controller 108. In the preferred embodiment, the count is set to a midrange value of the microcontroller's counter range (i.e., $2^{16}/2$) in order to avoid negative count values, however, negative values may be used. The microcontroller keeps a running "count" by constantly summing each signed encoder pulse to the total count stored in memory. This count represents the rotational position of the encoder shaft 148 relative to its position at steering sensor reset.

In a preferred embodiment, the resilient belt 158 is an O-ring. Other types of belts, such as standard timing belts or chains, or wire fishing line, may also be utilized. The resilient cable 160 is preferably made of steel and has a nylon coating to resist chafing and contaminant adhesion. Other types of cable may be used. The recoil spring 164 may be of a type known as a spring motor as found, for example, in automatically retracting tape measures. The diameters of pulleys 150 and 152 are chosen so as to give reasonable resolution, in inches per count, from the encoder 146. Alternate materials, encoders, and pulley diameters may be used. Additionally, alternate methodologies may be used for converting the extension and retraction of the resilient cable 160 to operate the encoder 146, such as, for example, a geared transmission system or a rack and pinion system.

Extension of the resilient cable 160 from the mechanical housing 142 forces the recoil spring 164 to tighten, while retraction of the resilient cable 160 from the mechanical housing 142 allows the recoil spring 164 to relax. Pulley 153 rotates freely on shaft 156.

As the transfer pulley 152 rotates, it forces the resilient belt 158 to rotate, which in turn rotates the encoder pulley 150. Rotation of the encoder pulley 150 rotates an encoder shaft of the encoder 146. The encoder 146 produces electrical pulses indicative of the angular displacement and direction of rotation of the encoder shaft. The microcontroller on the circuit board 144 sums the pulses to determine the position of the encoder shaft. When requested by a system controller (not shown), the steering sensor reports the count stored in its memory. The difference between a first and a subsequent second count is indicative of the rotational displacement and direction of a steering component in the time period between the first and second counts.

To measure rotation, the mechanical housing 142 is affixed to a stationary component of the vehicle (not shown), and the resilient cable 160 is wrapped around a rotating component (not shown) with its lug 162 fixedly attached to the rotating component. The resilient cable 160 length is typically determined so as to allow for maximum extension at extreme rotational extents.

To measure relative positional displacement, the mechanical housing 142 is attached to a movable component of the vehicle (not shown), and the lug 162 of the resilient cable 160 is pivotably attached to a stationary feature on the vehicle. The resilient cable 160 length is typically determined so as to allow for maximum extension at extreme limits of motion of the movable feature.

A unitary steering sensor (i.e., a single steering sensor measuring a single parameter in a steering system) cannot determine steering lash or steering looseness. A system controller may, however, collect information from at least two steering sensors and calculate the steering lash or steering looseness. Such a system controller may be, for example, 1) a device that interfaces with the driver of a vehicle, 2) a fully automatic device embedded within the vehicle itself (e.g, an engine controller), or 3) a device which remotely interacts with the vehicle via a wired or wireless connection.

Figure 13A:
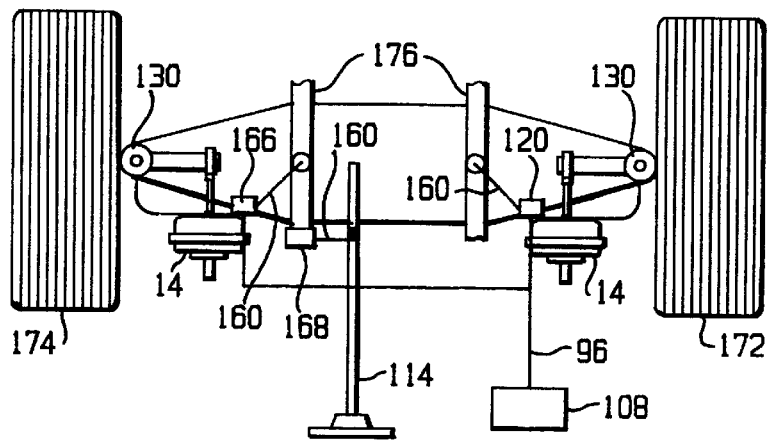
FIG. 13A illustrates a vehicle steering system in a neutral position.
Figure 13B:
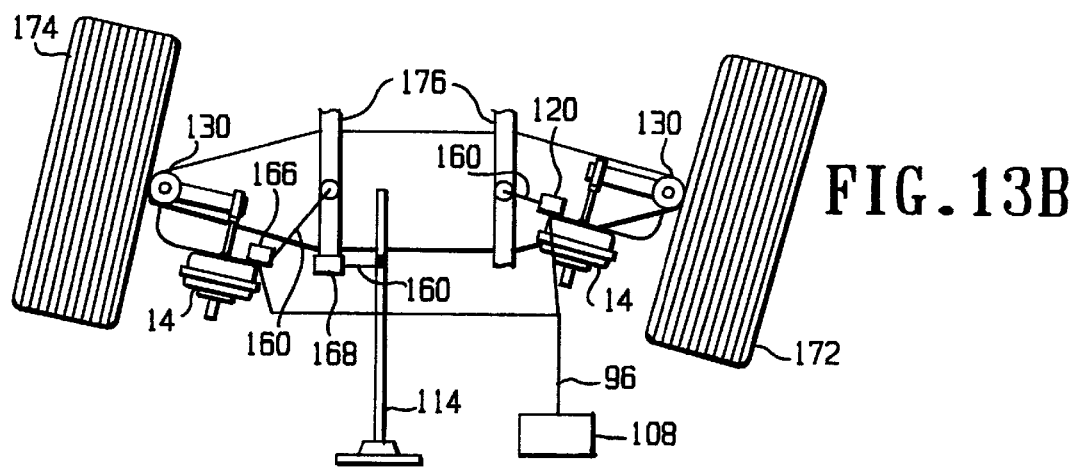
FIG. 13B illustrates a vehicle steering system in a right turn position.
Figure 13C:
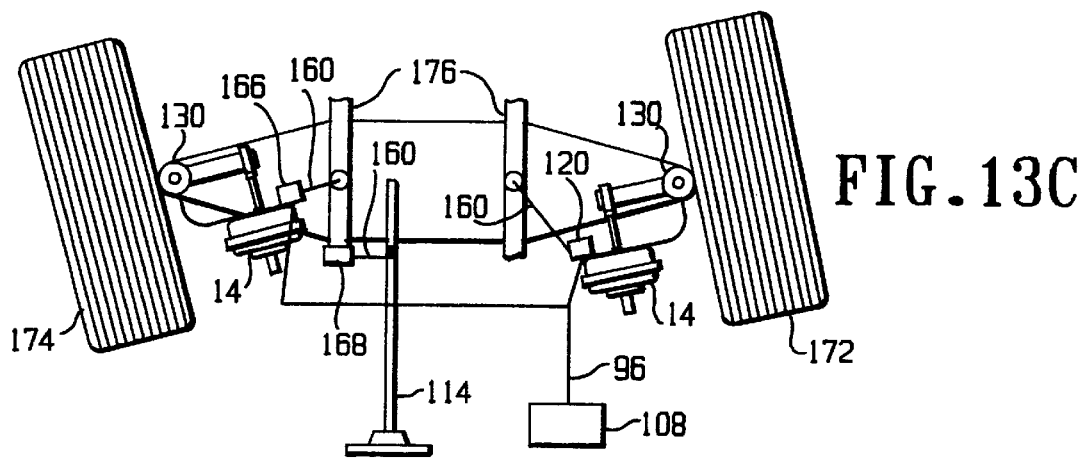
FIG. 13C illustrates a vehicle steering system in a left turn position.

FIGS. 13A, 13B, and 13C, illustrate a steering system in three positions. The steering system includes three steering sensors 166, 168, 170 (similar to 140 FIG. 12) in order to measure steering lash and steerable wheel looseness. One steering sensor is located near each of a right steerable wheel 172, a left steerable wheel 174, and the steering column 114. Each of two steerable wheel sensors 166, 170 is associated with a steerable wheel 174, 172, respectively, and may be mounted to a brake actuator assembly 14.

Figure 14:
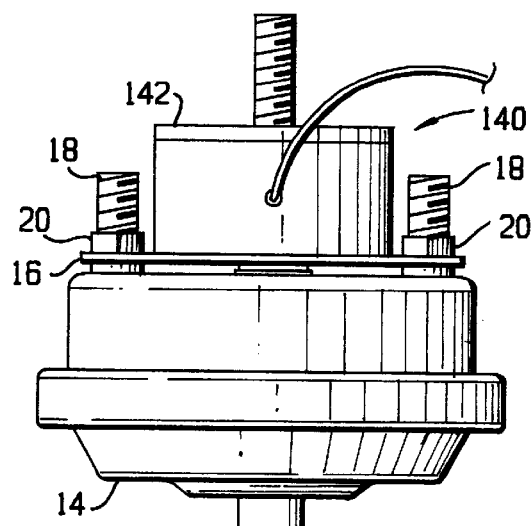
FIG. 14 illustrates a steering sensor mounted to a brake actuator.

FIG. 14 depicts a mechanical housing 142 of a steering sensor 140 (similar to 166 or 170) mounted to a brake actuator assembly 14 utilizing the brake actuator's mounting studs 18 and mounting hardware 20. For example, steering sensors may be manufactured to accept standardized mounting stud geometries, or a mounting bracket 16 can be utilized as a mechanical interface between the brake actuator assembly 14 and the steering sensor's 140 mechanical housing 142.

As shown in FIGS. 13A, 13B, and 13C, resilient cables 160, each extending from a respective sensor 166, 170 (each associated with a steerable wheel 174, 172) is pivotably mounted to the vehicle's chassis 176 via its termination 162 (FIG. 12A). Other locations and methods of mounting steering sensors 166 and 170 and the resilient cables 160 to the vehicle may be used. Preferably, angular displacement of the steerable wheels does not allow a hysteresis effect with respect to the measured length of the resilient cables 160. In other words, there is one measured length associated with each degree of angular displacement of the steerable wheel 172, 174. As the steerable wheels 172, 174 turn fully from right to left, the resilient cables 160 move in one direction (minor variations resulting from vehicle vibration or shock are acceptable).

The steering sensor 168 (similar to 140 FIG. 12) for the steering column 114 is preferably mounted to a stationary portion of the vehicle, such as, for example, the chassis 176. A resilient cable 160, extending from steering sensor 168, may be wrapped around the steering column 114 and preferably has its termination 162 (FIG. 12A) fixedly attached to the steering column 114. The resilient cable's 160 length is chosen so as to allow for maximum extension at extreme rotational extents of the steering column 114. Each of the steering lash system's three steering sensors 166, 168, 170 communicates with a system controller 108 and use the vehicle's electrical power line 96 as both a power and a communications bus.

C. STEERING LASH MEASUREMENT

Use of steering sensors 140 to determine steering lash is exemplified in FIGS. 13A, 13B, and 13C. FIG. 13A shows a steering system in a neutral ("straight ahead") condition. FIG. 13B shows the steerable wheels 174, 172 as the steering column 114 is rotated to the right. FIG. 13C shows the steering system as the steering column 114 is rotated to the left.

Steering lash is generally defined as the amount of looseness between the steering column 114 and the steering knuckles 130 (FIG. 11). Each of the steering lash system's three steering sensors' resilient cables 160 have enough length to allow the steerable wheels 174, 172 to travel completely to the left or right. As the steering column 114 is rotated to the right (FIG. 13B), the resilient cables 160 of steering sensors 166 and 168 are lengthened, thus incrementing the count reported by the encoders in steering sensors 166 and 168. Simultaneously, the resilient cable 160 of steering sensor 170 is shortened, decrementing the count reported by the encoder in steering sensor 170. As the steering column 114 is rotated to the left, the resilient cable 160 of steering sensors 166 and 168 are shortened, thus decrementing the count reported by the encoders in steering sensors 166 and 168. Simultaneously, the resilient cable 160 of steering sensor 170 is lengthened, incrementing the count reported by the encoder in steering sensor 170.

Figure 15:
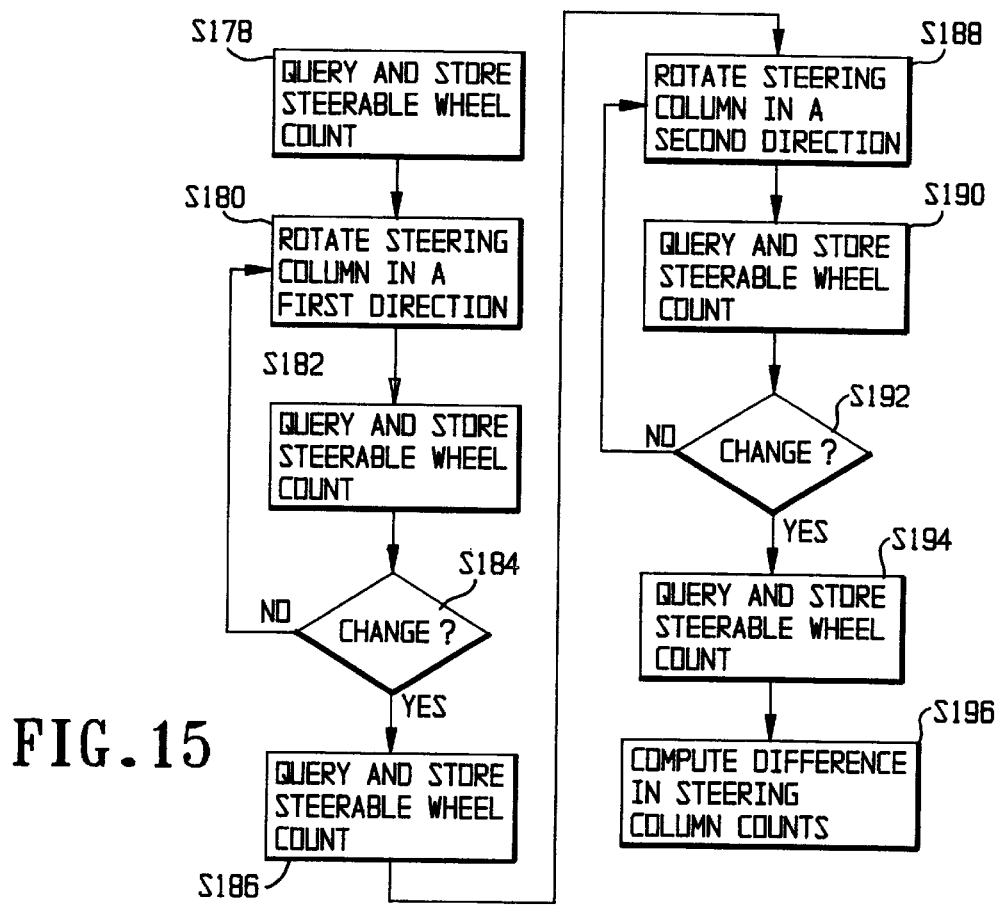
FIG. 15 is a flowchart illustrating a decisional tree for steering lash measurement.

FIG. 15 is a flowchart describing the steps used to measure steering lash. A steering lash measurement begins at step S178 where a system controller retrieves data from a first steering sensor associated with a steerable wheel. The data represents the steerable wheel's relative location. At step S180, the system controller directs that the steering column be rotated in a first direction. At step S182, the first steering sensor data is once again retrieved. At step S184 the system controller determines if the steerable wheel has responded to the rotation of the steering column, based on data from the first steering sensor. If the steerable wheel has responded to the rotation of the steering column, then the data representing the steerable wheel's relative location will have changed. If the steerable wheel data has not changed, then the system controller continues to request that the steering column be rotated in a first direction as the decisional path returns to step S180. The first steering sensor is queried until the measured steerable wheel begins to respond at which point the decisional tree branches to step S186. At this point in time, all lash has been taken out of the system (ie., any further rotation in the first direction by the steering column will result in further response by the measured steerable wheel in the same direction). At step S186, the system controller stores the count of the steering column steering sensor. At step S188 the system controller directs that the steering column be rotated in the opposite direction from the first direction (i.e., a second direction). At step S190 the first steering sensor data is once again retrieved. At step S192 the system controller determines if the steerable wheel has responded to the rotation of the steering column. If the steerable wheel has responded to the rotation of the steering column, then the data representing the steerable wheel's relative location will have changed. If the steerable wheel data has not changed, then the controller continues to request that the steering column be rotated in the second direction as the decisional path returns to step S188. The first steering sensor is queried until the measured steerable wheel begins to respond at which point the decisional tree branches to step S194. At step S194, the system controller stores the count of the first steering sensor. At step S196 the difference between the counts of the steering column steering sensor retrieved at steps S186 and S194 is calculated. This difference is the steering lash. The system controller may translate the count into degrees of steering column revolution. A constant, which translates the steering column steering sensor count into degrees of revolution may be stored in the steering column steering sensor microcontroller or may be stored in the system controller.

Figure 16A:
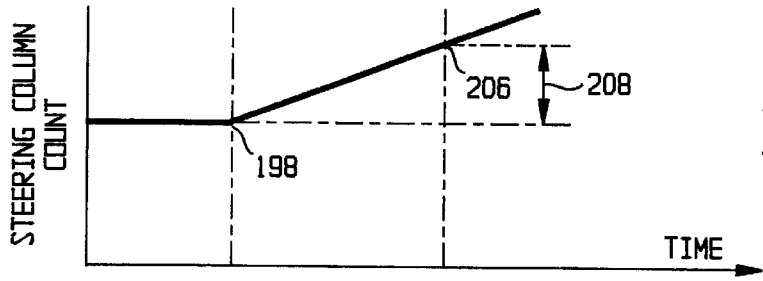
FIG. 16A is a graph of steering column count vs. time.
Figure 16B:
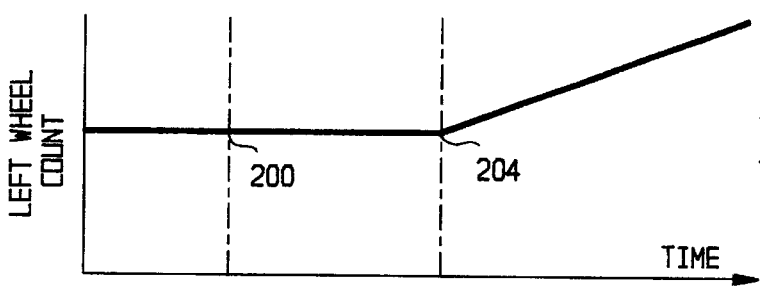
FIG. 16B is a graph of left wheel count vs. time.
Figure 16C:
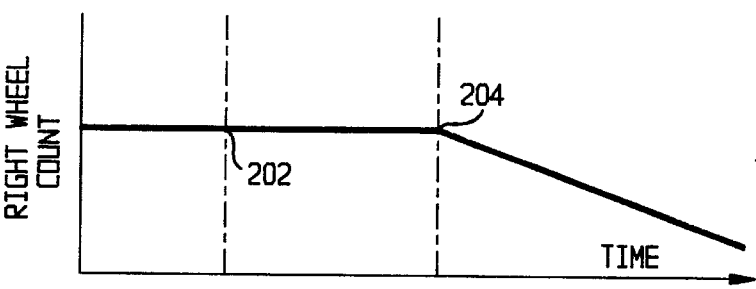
FIG. 16C is a graph of right wheel count vs. time.

FIGS. 16A, 16B, and 16C depict an example of the count (i.e., the indication of measured length or rotation) as a function of time, measured by the steering sensors associated with the steering column, left, and right steerable wheels, respectively. The system controller determines steering lash by storing a steering column count 198 (FIG. 16A) at a point in time when it is known that all steering lash has been taken from the steering system. Almost simultaneously the system controller stores at least one count from a steering sensor associated with either the left wheel 200 (FIG. 16B) or right wheel 202 (FIG. 16C), respectively. It then monitors the measured steerable wheel count(s) to determine a point 204 at which at least the measured steerable wheel starts to respond to the steering column rotation. At this point, the count of the steering column 206 is again stored. The difference 208 between the first steering column count 198 and the last steering column count 206 corresponds to the amount of steering lash in the system.

D. STEERABLE WHEEL LOOSENESS MEASUREMENT

When a steering sensor is associated with each steerable wheel, the angular difference in steering column response between a right steerable wheel 172 (FIG. 13) and a left steerable wheel 174 (FIG. 13) (i.e., steerable wheel looseness) can be measured.

Figure 17:
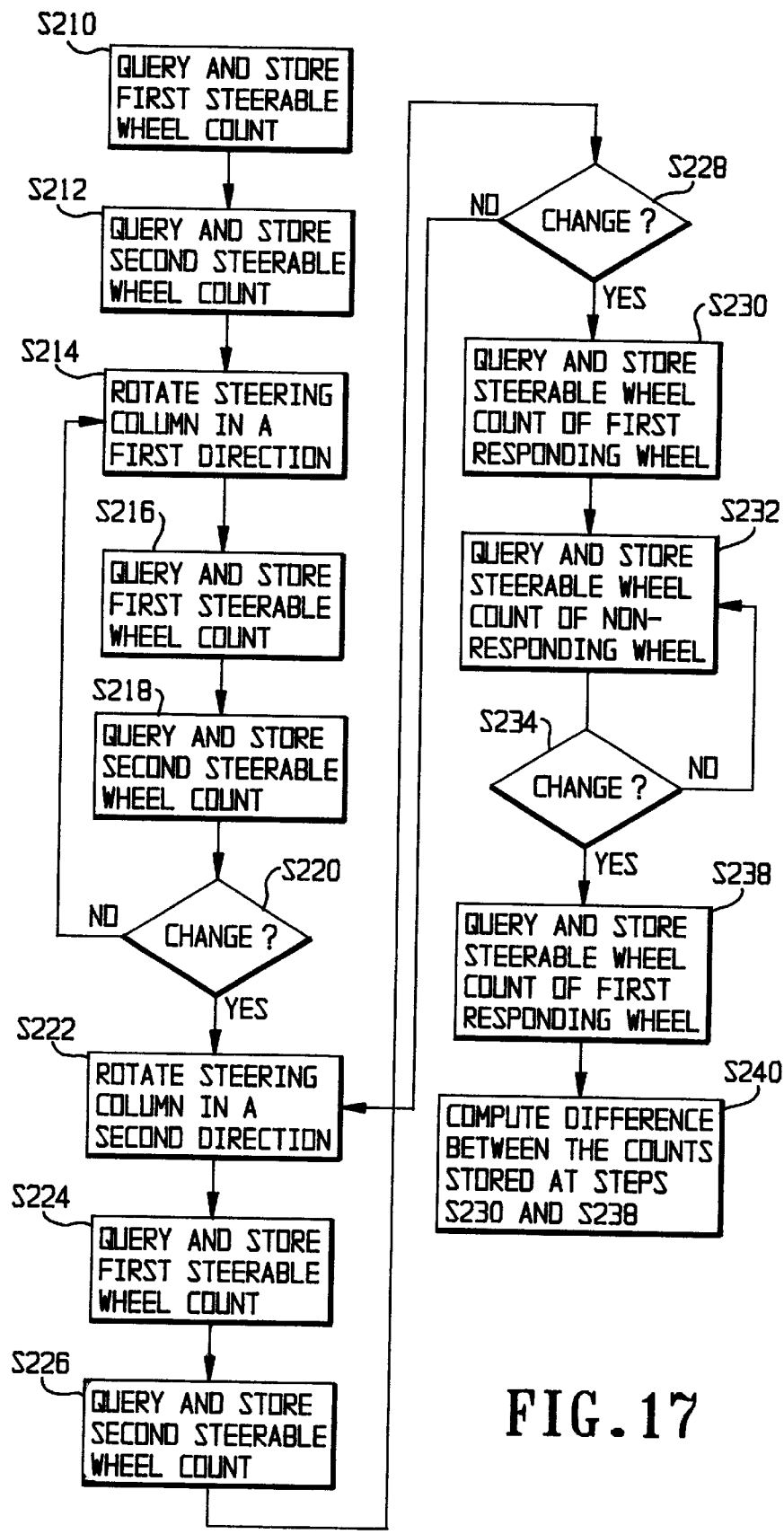
FIG. 17 is a flowchart illustrating a decisional tree for steering looseness measurement.

FIG. 17 is a flowchart describing the steps required to measure steerable wheel looseness. A steering looseness measurement begins at step S210 where a system controller retrieves the data from a steering sensor associated with a first steerable wheel. The data represents the steerable wheel's location relative to the steering sensor. Next at step S212 the system controller retrieves the data from a steering sensor associated with a second steerable wheel. At step S214, the system controller directs that the steering column be rotated in a first direction. At step S216 and S218 the first and second steerable wheels' steering sensor data is once again retrieved. At step S220 the system controller determines if the steerable wheels have responded to the rotation of the steering column. If both steerable wheels have responded to the rotation of the steering column, then the data representing each of the steerable wheels' relative location will have changed. If both of the steerable wheels' data have not changed, then the controller continues to request that the steering column be rotated in a first direction as the decisional path returns to step S214. The steerable wheel steering sensors are queried until both steerable wheels begin to respond, at which point the decisional tree branches to step S222. At this point in the process, all lash and looseness have been taken out of the system (i.e., any further rotation in the first direction by the steering column will result in further response by both steerable wheels in the same direction). At step S222, the system controller directs that the steering column be rotated in the opposite direction from the first direction (i.e., a second direction). At step S224 the first steerable wheel steering sensor data is once again retrieved. At step S226 the second steerable wheel steering sensor data is once again retrieved. At step S228 the system controller determines if either steerable wheel has responded to the rotation of the steering column. If either steerable wheel has responded to the rotation of the steering column, then the data representing that steerable wheel's relative location will have changed. If neither of the steerable wheels' data has changed, then the controller continues to request that the steering column be rotated in a first direction as the decisional path returns to step S222. Each steerable wheel steering sensor is queried until one of the steerable wheels begins to respond (i.e., the responding steerable wheel) at which point the decisional tree branches to step S230. At step S230, the system controller stores the count of the responding steerable wheel steering sensor. The steering column continues to be rotated in the second direction. At step S232 the non-responding steerable wheel steering sensor is queried. At step S234 the system controller determines if the non-responding steerable wheel count has changed. If the count has not changed then the decisional tree branches back to step S232. If the non-responding wheel does begin to respond, then the decisional tree branches to step S238. At step S238, the system controller again stores the count of the first responding steerable wheel steering sensor. At step S240 the difference between the counts stored at steps S230 and S238 is calculated. This difference is the steering looseness. The system controller may translate this difference into an angular indication of looseness. A constant that translates the steerable wheel steering sensor count into degrees may be stored in the steerable wheel steering sensor microcontroller or may be stored in the system controller.

Figure 18A:
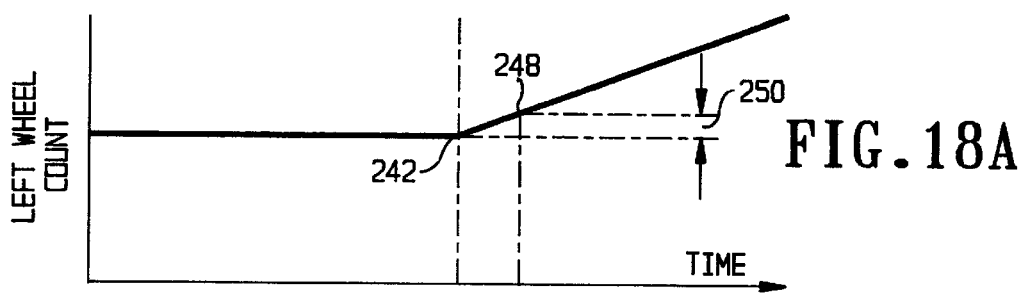
FIG. 18A is a graph of left wheel count vs. time.
Figure 18B:
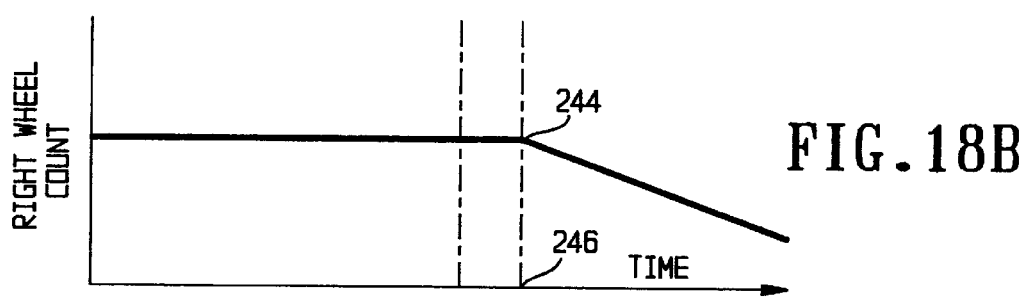
FIG. 18B is a graph of right wheel count vs. time.

As depicted in FIGS. 18A and 18B, the system controller determines the amount of looseness between the right and left steerable wheels by determining the difference in counts from the steering sensor of a first responding steerable wheel when that wheel first begins to respond and when a second responding wheel begins to respond. In the example depicted in FIGS. 18A and 18B, the left wheel is the first responding wheel, having responded to the steering column's rotation first in time. The count of the left steering sensor 242 is stored upon first response. The count of a second responding wheel (i.e., in the example of FIG. 18B, the right wheel) is monitored until it, too, begins to respond to the steering column rotation 244. Shortly after the point in the process where the second responding wheel (i.e., the right wheel) begins to respond 246, the count 248 of the first responding wheel (i.e., the left wheel in the example of FIG. 18A) is again determined and stored. The difference in counts 250, between the count of the first responding wheel when it first began to respond to the steering column rotation 242 and the count of the first responding wheel when the second responding wheel began to respond to the steering column rotation 248, corresponds to the amount of steerable wheel looseness between the right and left steerable wheels of the vehicle.

Figure 19:
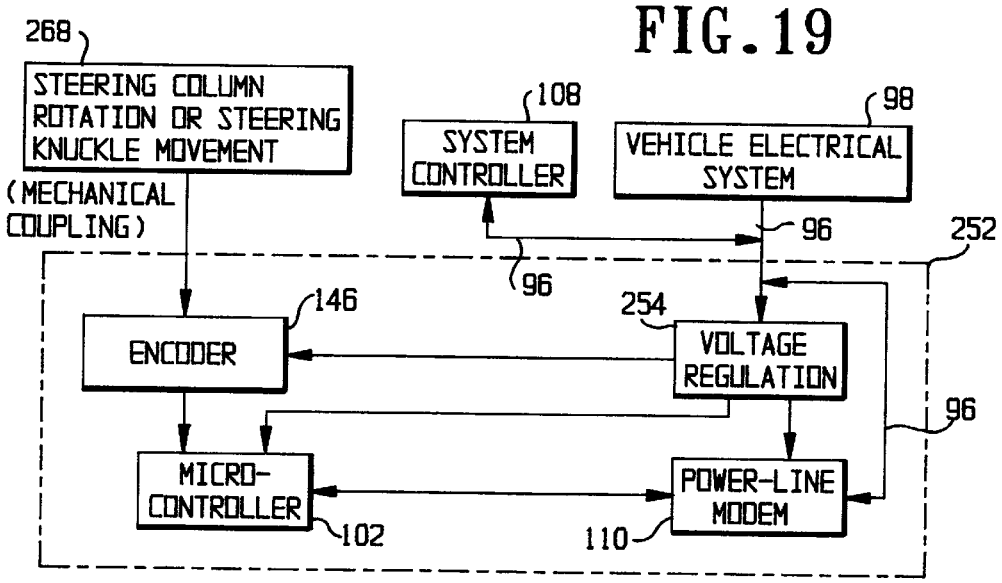
FIG. 19 illustrates a block diagram of a steering sensor.

FIG. 19 shows a block diagram of a steering sensor. A vehicle's electrical power-line 96 provides vehicle electrical power (typically 12 volts direct current) from the vehicle's electrical system 98 to the steering sensor control/communication assembly 252, which can, for example, be located within the steering sensor's mechanical housing 142 (FIGS. 12A and 12B). The vehicle's electrical power is passed through a voltage regulator circuit 254 (similar to 100 FIG. 8) to generate regulated voltages to power, for example, the encoder 146, microcontroller 102, and power-line modem 110.

An encoder 146 is mechanically coupled to the steering column or a steering knuckle so that the steering column rotation or steering knuckle movement 268 can be represented to the microcontroller 102 by the encoder's 146 output. Microcontroller 102 calculates and keeps track of a "count," which is indicative of either steering column relative rotational position or steering knuckle relative position. When the system controller 108 addresses the microcontroller 102 by its unique address, the microcontroller 102 transmits a current steering column or steering knuckle count to the power-line modem 110. The power-line modem 110 modulates the data onto the vehicle's electrical power-line 96 and transmits the steering sensor's information to the system controller 108, which is also connected to the vehicle's electrical power-line 96.

E. COMBINED BRAKE STROKE AND STEERING SENSOR

An alternate embodiment of the invention combines the functionality of a brake sensor control/communications assembly 8 (FIG. 8) with a steering sensor control/communications assembly 252 (FIG. 19) into one mechanical housing. The resultant dual-purpose sensor makes use of the electronic components required by both sensors. The components of each control/communications assembly 8 and 252 may preferably be installed onto a common control/communications assembly 256. The common functions of the voltage regulation 254, microcontroller 102, and power-line modem 110 may be preferably performed by singular circuits to avoid duplication of electronic components.

Figure 20A:
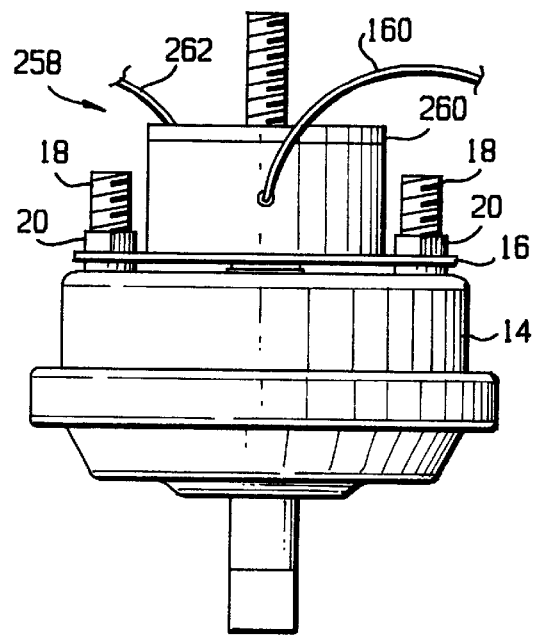
FIG. 20A illustrates a combined brake stroke and steering sensor mounted to a brake actuator.
Figure 20B:
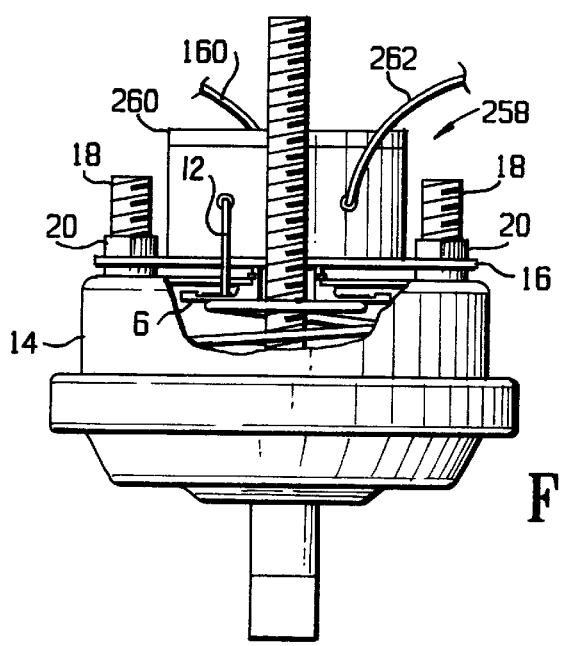
FIG. 20B illustrates a combined brake stroke and steering sensor mounted to a brake actuator with a partial cutaway view of the brake actuator revealing a force-sensing assembly.

FIGS. 20A and 20B depict one possible mounting configuration of a dual-purpose sensor 258. In a preferred embodiment, the dual-purpose sensor 258 is mounted to a mounting bracket 16 which, in turn, is mounted to a brake actuator assembly 14 utilizing the brake actuator's mounting studs 18 and mounting hardware 20. In the embodiment of FIGS. 20A and 20B, the resilient cable 160 passes through a mechanical housing 260 on a side of the mechanical housing 260 that is approximately opposite to the side where penetration holes are located for the power/communications cable 262 and the interface conductors 12 (between the force-sensing assembly 6 and the brake sensor control/communications assembly 8). The power/communications cable 262 and interface conductors 12 should be designed so as not to chafe against the resilient cable 160. The force-sensing assembly 6 of the brake stroke sensor portion of the dual-purpose sensor 258, may be housed externally of the mechanical housing 260. The force-sensing assembly 6 is mounted within the brake actuator service chamber 10 (FIG. 1).

Figure 21:
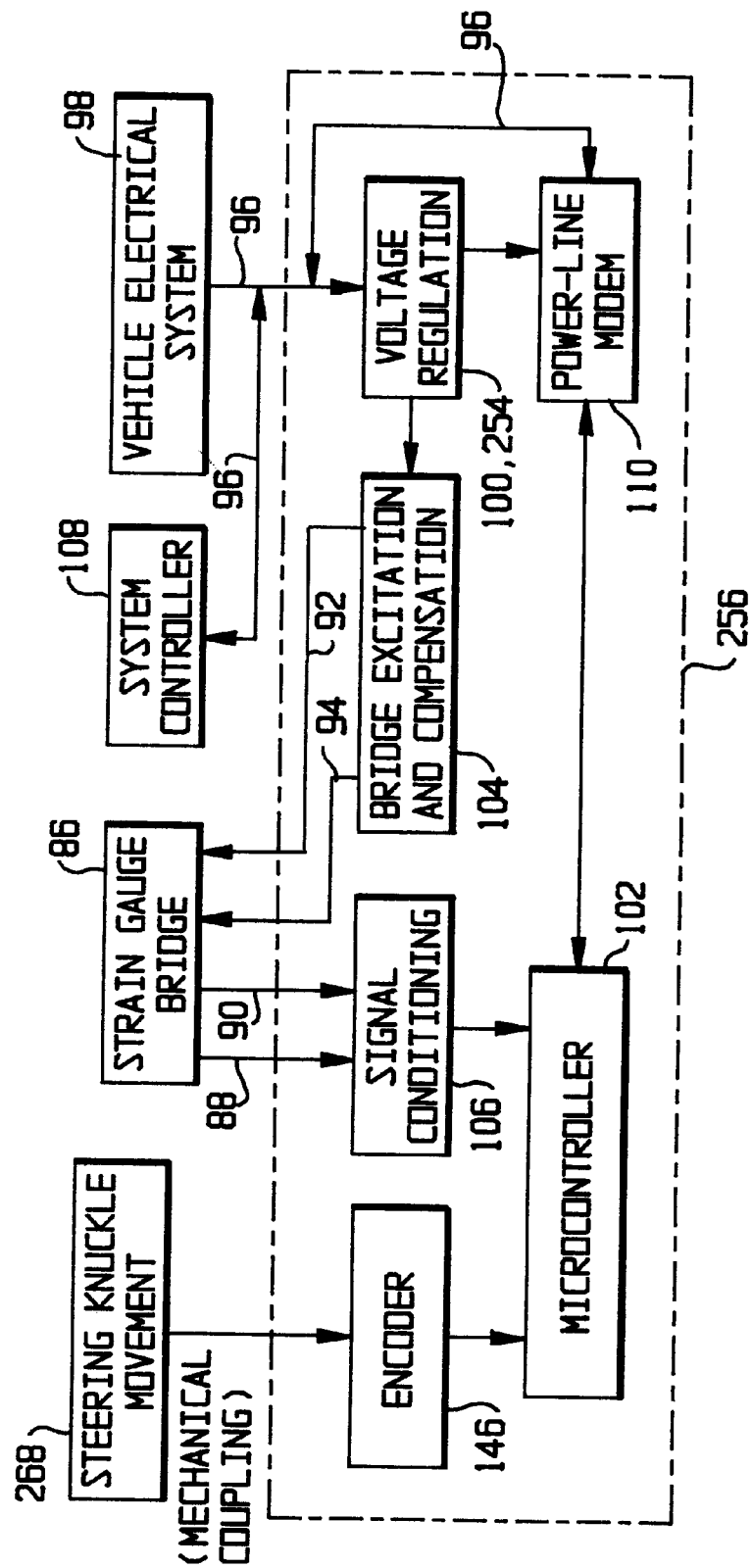
FIG. 21 illustrates a block diagram of a combined brake stroke and steering sensor.

FIG. 21 is a block diagram representation of the dual-purpose sensor's control/communications assembly 256. A vehicle's electrical system 98 provides vehicle electrical power (typically 12 volts direct current) from the vehicle's electrical system 98 via its electrical power line 96 to the dual-purpose sensor's control/communications assembly 256. The functions of the elements described by reference numbers in FIG. 21 are as described in the preceding text associated with the block diagrams of FIGS. 8 and 19.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A brake stroke sensor for determining a position of a brake actuator pushrod comprising:
   a spring operatively connected to the pushrod to be compressed by pushrod movement;
   a strain gauge, said strain gauge measuring a strain imparted by the spring and outputting a strain signal based on the strain; and
   a microcontroller configured to convert said strain signal into an output signal indicative of said position of said brake actuator pushrod, said microcontroller storing coefficients of a nonlinear equation, said nonlinear equation representing a relationship between said strain signal and said position of said brake actuator pushrod.

2. A brake stroke sensor as in claim 1, wherein said microcontroller is configured to produce an output signal representative of the strain, and configured to store a unique address identifying said microcontroller.

3. A brake stroke sensor as in claim 1, further comprising a modem configured to modulate said output signal onto an electrical bus.

4. A brake stroke sensor as in claim 1, wherein said brake stroke sensor is configured to transmit data after said brake stroke sensor receives a request for data addressed to said brake stroke sensor's own unique address.

5. A brake stroke sensor as in claim 1, wherein said microcontroller is configured to store and transmit calibration coefficients used to convert said output signal into a value indicative of the length of pushrod stroke.

6. A brake stroke sensor as in claim 1, wherein said strain signal is an analog voltage substantially proportional to a distance that said pushrod extends from a brake actuator.

7. A brake stroke sensor as in claim 1, wherein said spring comprises a return spring for returning a pushrod to a home position.

8. A brake stroke sensor for determining a position of a brake actuator pushrod, comprising:
- a force-receiving plate having a first surface and a second surface and a bore through said first and second surfaces, said pushrod passing through said bore;
- a spring operatively connected to said pushrod and said force-receiving plate configured to be deflected during pushrod movement in a first direction;
- a strain gauge bridge disposed on said force-receiving plate, said strain gauge bridge outputting a strain signal; and
- a microcontroller configured to convert said strain signal into an output signal indicative of said position of said brake actuator pushrod, said microcontroller storing coefficients of a nonlinear equation, said nonlinear equation representing a relationship between said strain signal and said position of said brake actuator pushrod.

9. A force-receiving plate as in claim 8, wherein said first surface has a feature to align said spring and maintain said spring in concentric alignment with said pushrod.

10. A brake stroke sensor as in claim 8, wherein said second surface has a protrusion configured to support said force-receiving plate away from interior surfaces of a brake actuator.

11. A brake stroke sensor as in claim 10, wherein said protrusion has a groove configured to accept a retaining device.

12. A brake stroke sensor as in claim 10, further comprising:
- said protrusion extends away from said second surface of said force-receiving plate and has at least a first section and a second section;
- said first section has a first diameter and lies closer to said second surface than said second section, and said second section has a second diameter;
- said diameter of said first section is larger than said diameter of said second section; and
- said second section penetrates a brake actuator through a bore in said brake actuator.

13. A brake stroke sensor as in claim 8, wherein said strain gauge bridge comprises at least two strain gauges configured to measure strain imposed upon said force-receiving plate across substantially the entire surface of said force-receiving plate.

14. A brake stroke sensor as in claim 8, wherein said strain gauge bridge comprises at least two strain gauges configured to cover substantially a stress concentration annulus located approximately about an intersection of said second surface and said protrusion.

15. A brake stroke sensor as in claim 10, wherein a surface of said force-receiving plate includes a member configured to improve the stiffness of said force-receiving plate.

16. A brake stroke sensor as in claim 15, wherein said member is an annular ring.

17. A brake stroke sensor as in claim 8, wherein said strain gauge bridge comprises:
- at least four strain gauges, mounted approximately ninety degrees apart from each other, each lying on a plane of said second surface; and
- a strain gauge measurement axis for each strain gauge being roughly parallel to an imaginary line extending from the center of said force-receiving plate to an outer edge of said force-receiving plate.

18. A strain gauge bridge as in claim 17, wherein said strain gauge bridge is configured in a Wheatstone type configuration.

19. A strain gauge bridge as in claim 17, wherein said strain gauge bridge includes at least two resistors.

20. A strain gauge bridge as in claim 17, wherein a connector is integrated for carrying a strain gauge bridge excitation voltage and said strain signal.

21. A brake stroke sensor as in claim 8, wherein said strain gauge bridge comprises:
- at least two strain gauges, mounted approximately one hundred and eighty degrees apart from each other, each lying on a plane of said second surface; and
- a strain gauge measurement axis for each strain gauge being roughly parallel to an imaginary line extending from the center of said force-receiving plate to an outer edge of said force-receiving plate.

22. A strain gauge bridge as in claim 21, wherein said strain gauge bridge is configured in a Wheatstone type configuration.

23. A strain gauge bridge as in claim 21, wherein said bridge includes at least two resistors.

24. A strain gauge bridge as in claim 21, wherein a connector is integrated to carry a strain gauge bridge excitation voltage and said strain signal.

25. A method of determining a position of a brake actuator pushrod in a brake actuator's range of motion comprising:
- compressing a spring by movement of the pushrod thereby imparting a strain to a strain gauge bridge operatively connected to the spring;
- measuring the strain imparted to the strain gauge bridge, whereby the measured strain is proportional to strain gauge bridge output;
- digitizing an analog representation of the measured strain to produce a digitized measured strain indicative of said position of said brake actuator pushrod;
- storing the digitized measured strain in a microcontroller, whereby the microcontroller has a unique address;
- storing coefficients of a nonlinear equation in said microcontroller, said nonlinear equation representing a relationship between said strain signal and said position of said brake actuator pushrod; and
- transmitting the digitized measured strain from the microcontroller to a system controller upon being addressed by the system controller.

26. The method of claim 25, wherein said microcontroller compares said digitized measured strain to a maximum value stored in said microcontroller and replaces said maximum value with said digitized measured strain if said digitized measured strain is greater than said maximum value.

27. The method of claim 25, wherein the system controller and the microcontroller interface through a modem.

28. The method of claim 27, wherein a single electrical power line and a chassis ground connect the modem with the system controller.

29. The method of claim 25, wherein said strain gauge bridge output is substantially proportional to the length of the pushrod as the pushrod extends from a brake actuator.

30. The brake stroke sensor of claim 1, wherein said output signal is indicative of an actual position of the pushrod throughout a continuous range.

31. The brake stroke sensor of claim 8, wherein said output signal is indicative of an actual position of the pushrod throughout a continuous range.

32. The method of claim 25, wherein said output signal is indicative of an actual position of the pushrod throughout a continuous range.

* * * * *